(12) United States Patent
Singh et al.

(10) Patent No.: US 8,010,685 B2
(45) Date of Patent: Aug. 30, 2011

(54) METHOD AND APPARATUS FOR CONTENT CLASSIFICATION

(75) Inventors: Sumeet Singh, Fremont, CA (US);
George Varghese, Sunnyvale, CA (US);
Michael Ayres, San Diego, CA (US);
Michael Semanko, Santa Clara, CA (US); Bashir Eghbali, San Diego, CA (US); Travis G Newhouse, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 11/272,461

(22) Filed: Nov. 9, 2005

(65) Prior Publication Data

US 2006/0161986 A1 Jul. 20, 2006

Related U.S. Application Data

(60) Provisional application No. 60/522,810, filed on Nov. 9, 2004.

(51) Int. Cl.
*G06F 15/16* (2006.01)
*G06F 11/00* (2006.01)
(52) U.S. Cl. .......................... 709/229; 726/24
(58) Field of Classification Search ............... 726/24, 726/13, 23; 709/229; 713/200
See application file for complete search history.

(56) References Cited

U.S. PATENT DOCUMENTS

| | | | |
|---|---|---|---|
| 4,734,856 A | 3/1988 | Davis | |
| 6,016,546 A * | 1/2000 | Kephart et al. | 726/24 |
| 6,279,113 B1 * | 8/2001 | Vaidya | 726/23 |
| 6,477,651 B1 | 11/2002 | Teal | |
| 6,519,703 B1 * | 2/2003 | Joyce | 726/22 |
| 6,578,147 B1 | 6/2003 | Shanklin et al. | |
| 6,738,814 B1 | 5/2004 | Cox et al. | |
| 6,829,635 B1 | 12/2004 | Townshend | |
| 6,988,208 B2 | 1/2006 | Hrabik et al. | |
| 7,080,408 B1 | 7/2006 | Pak et al. | |
| 7,089,592 B2 | 8/2006 | Adjaoute | |
| 7,130,981 B1 * | 10/2006 | Nachenberg | 711/170 |
| 7,251,692 B1 | 7/2007 | Raz | |
| 7,451,309 B2 * | 11/2008 | Aaron et al. | 713/160 |
| 7,535,909 B2 | 5/2009 | Singh et al. | |

(Continued)

FOREIGN PATENT DOCUMENTS

WO    WO-2005103899 A1    11/2005

OTHER PUBLICATIONS

"U.S. Appl. No. 11/271,133, Final Office Action mailed May 14, 2009", 9 pgs.

(Continued)

*Primary Examiner* — Tammy T Nguyen
*Assistant Examiner* — Michael A Chambers
(74) *Attorney, Agent, or Firm* — Schwegman, Lundberg & Woessner, P.A.

(57) ABSTRACT

A method and apparatus is described to select a representative signature for use in identifying content in a packet stream. The method may comprise receiving the packet stream and obtaining content from a data payload of the packet. Thereafter, a plurality of signatures is identified from the content and a complexity score or a frequency score is determined based on the content. A signature of the plurality of signatures is then selected as the representative signature based on the complexity score or the frequency score.

23 Claims, 9 Drawing Sheets

U.S. PATENT DOCUMENTS

| | | | |
|---|---|---|---|
| 7,917,955 B1* | 3/2011 | Spurlock et al. | 726/24 |
| 2002/0107953 A1 | 8/2002 | Ontiveros et al. | |
| 2002/0129140 A1* | 9/2002 | Peled et al. | 709/224 |
| 2003/0004689 A1 | 1/2003 | Gupta et al. | |
| 2003/0014503 A1* | 1/2003 | Legout et al. | 709/219 |
| 2003/0067921 A1 | 4/2003 | Sivalingham | |
| 2003/0105973 A1* | 6/2003 | Liang et al. | 713/200 |
| 2003/0115485 A1 | 6/2003 | Milliken | |
| 2003/0145232 A1 | 7/2003 | Poletto et al. | |
| 2003/0226035 A1 | 12/2003 | Robert et al. | |
| 2004/0054925 A1 | 3/2004 | Etheridge et al. | |
| 2004/0064737 A1 | 4/2004 | Milliken et al. | |
| 2004/0073617 A1 | 4/2004 | Milliken et al. | |
| 2004/0117648 A1* | 6/2004 | Kissel | 713/200 |
| 2004/0215976 A1 | 10/2004 | Jain | |
| 2004/0257994 A1* | 12/2004 | Paskett et al. | 370/230 |
| 2005/0041955 A1* | 2/2005 | Beuque | 386/94 |
| 2005/0060535 A1* | 3/2005 | Bartas | 713/154 |
| 2005/0060754 A1* | 3/2005 | Simyon | 725/112 |
| 2005/0076228 A1* | 4/2005 | Davis et al. | 713/188 |
| 2005/0111367 A1 | 5/2005 | Chao et al. | |
| 2005/0114700 A1* | 5/2005 | Barrie et al. | 713/201 |
| 2005/0229254 A1 | 10/2005 | Singh et al. | |
| 2005/0262556 A1 | 11/2005 | Waisman et al. | |
| 2005/0262561 A1 | 11/2005 | Gassoway | |
| 2006/0048209 A1* | 3/2006 | Shelest et al. | 726/1 |
| 2006/0064746 A1* | 3/2006 | Aaron et al. | 726/13 |
| 2006/0072464 A1* | 4/2006 | Aaron et al. | 370/241 |
| 2006/0098585 A1 | 5/2006 | Singh et al. | |
| 2006/0098687 A1 | 5/2006 | Singh et al. | |
| 2006/0107318 A1 | 5/2006 | Jeffries et al. | |
| 2006/0139187 A1* | 6/2006 | Helfman et al. | 341/51 |
| 2006/0150249 A1 | 7/2006 | Gassen et al. | |
| 2006/0242703 A1 | 10/2006 | Abeni | |
| 2007/0025243 A1* | 2/2007 | Ayyagari et al. | 370/229 |
| 2007/0047457 A1* | 3/2007 | Harijono et al. | 370/250 |
| 2007/0094728 A1 | 4/2007 | Julisch et al. | |
| 2007/0112714 A1 | 5/2007 | Fairweather | |
| 2007/0192863 A1 | 8/2007 | Kapoor et al. | |
| 2008/0140631 A1* | 6/2008 | Pandya | 707/3 |
| 2008/0140912 A1* | 6/2008 | Pandya | 711/101 |
| 2008/0140991 A1* | 6/2008 | Pandya | 712/37 |
| 2008/0219178 A1* | 9/2008 | Barrett | 370/252 |

OTHER PUBLICATIONS

Bloom, Burton, "Space/Time Trade-offs in Hash Coding with Allowable Errors", *Communications of the ACM* vol. 23 No. 7, (Jul. 1970), 422-426.

Estan, Christian, et al., "Building a Better NetFlow", *SIGCOMM 2004 Tech Report*, (Aug 2004), 12 pgs.

Fan, Li, et al., "Summary Cache: A Acalable Wide-Area Web Cache Sharing Protocol", *ACM SIGCOMM*, (Sep 1998), 12 pgs.

Graham, Paul, "A Plan for Spam", [Online]. Retrieved from the Internet: <URL: http://www.paulgraham.com/spam.html>, (Aug. 2002), 13 pgs.

Manber, Udi, "Finding Similar Files in a Large File System", *USENIX Technichal Conference*, (Jan. 1994), 11 pgs.

Moore, David, et al., "Inferring Internet Denial-of-Service Activity", *Proceedings of the 10th USENIX Security Symposium*, (Aug. 2001), 14 pgs.

Moore, David, et al., "Internet Quarantine: Requirements for Containing Self-Propagating Code", *22nd Annual Joint Conference of the IEEE Computer and Communications Societies*, (Apr. 2003), 10 pgs.

Rabin, Michael O, "Fingerprinting by Random Polynomials", *Center for Research in Computing Technology, Harvard University Report TR-15-91*, (1981), 14 pgs.

Singh, Sumeet, et al., "Automated Worm Fingerprinting", *6th Symposium on Operating Systems Design and Implementation. USENIX Association*, (Dec. 2004), 45-60.

* cited by examiner

| OFFSET | HEX | | | | | | | | | | | | | | | | ASCII |
|---|---|---|---|---|---|---|---|---|---|---|---|---|---|---|---|---|---|
| 0x0000 | 47 | 45 | 54 | 20 | 2f | 68 | 65 | 61 | 64 | 2e | 6a | 73 | 20 | 48 | 54 | 54 | GET /head.js HTT |
| 0x0010 | 50 | 2f | 31 | 2e | 31 | 0d | 0a | 41 | 63 | 63 | 65 | 70 | 74 | 3a | 20 | 2a | P/1.1..Accept: * |
| 0x0020 | 2f | 2a | 0d | 0a | 52 | 65 | 66 | 65 | 72 | 65 | 72 | 3a | 20 | 68 | 74 | 74 | /*..Referer: htt |
| 0x0030 | 70 | 3a | 2f | 2f | 77 | 77 | 77 | 2e | 61 | 7a | 6c | 79 | 72 | 69 | 63 | 73 | p://www.azlyrics |
| 0x0040 | 2e | 63 | 6f | 6d | 2f | 0d | 0a | 41 | 63 | 63 | 65 | 70 | 74 | 2d | 4c | 61 | .com/..Accept-La |
| 0x0050 | 6e | 67 | 75 | 61 | 67 | 65 | 3a | 20 | 65 | 6e | 2d | 75 | 73 | 0d | 0a | 41 | nguage: en-us..A |
| 0x0060 | 63 | 63 | 65 | 70 | 74 | 2d | 45 | 6e | 63 | 6f | 64 | 69 | 6e | 67 | 3a | 20 | ccept-Encoding: |
| 0x0070 | 67 | 7a | 69 | 70 | 2c | 20 | 64 | 65 | 66 | 6c | 61 | 74 | 65 | 0d | 0a | 55 | gzip, deflate..U |
| 0x0080 | 73 | 65 | 72 | 2d | 41 | 67 | 65 | 6e | 74 | 3a | 20 | 4d | 6f | 7a | 69 | 6c | ser-Agent: Mozil |
| 0x0090 | 6c | 61 | 2f | 34 | 2e | 30 | 20 | 28 | 63 | 6f | 6d | 70 | 61 | 74 | 69 | 62 | la/4.0 (compatib |
| 0x00a0 | 6c | 65 | 3b | 20 | 4d | 53 | 49 | 45 | 20 | 36 | 2e | 30 | 3b | 20 | 57 | 69 | le; MSIE 6.0; Wi |
| 0x00b0 | 6e | 64 | 6f | 77 | 73 | 20 | 4e | 54 | 20 | 35 | 2e | 31 | 3b | 20 | 41 | 54 | ndows NT 5.1; AT |
| 0x00c0 | 26 | 54 | 20 | 43 | 53 | 4d | 37 | 2e | 30 | 3b | 20 | 53 | 56 | 31 | 29 | 0d | &T CSM7.0; SV1). |
| 0x00d0 | 0a | 48 | 6f | 73 | 74 | 3a | 20 | 41 | 6d | 61 | 67 | 65 | 73 | 2e | 61 | 7a | .Host: images.az |
| 0x00e0 | 6c | 79 | 72 | 69 | 63 | 73 | 2e | 63 | 6f | 6d | 3a | 38 | 30 | 38 | 30 | 0d | lyrics.com:8080. |
| 0x00f0 | 0a | 43 | 6f | 6e | 6e | 65 | 63 | 74 | 69 | 6f | 6e | 3a | 20 | 4b | 65 | 65 | .Connection: Kee |
| 0x0100 | 70 | 2d | 41 | 6c | 69 | 76 | 65 | 0d | 0a | | | | | | | | p-Alive... |

METHOD AND APPARATUS FOR CONTENT CLASSIFICATION

CLAIM OF PRIORITY

This patent application claims the benefit of priority, under 35 U.S.C. Section 119(e), to U.S. Provisional Patent Application Ser. No. 60/522,810, filed on Nov. 9, 2004, the entire content of which is incorporated herein by reference.

TECHNICAL FIELD

This application relates to a method and apparatus to classify content in a packet communicated in a network.

BACKGROUND

A packet or datagram is a piece of a message transmitted over a packet-switching network. An example of a packet-switching network is the Internet where enormous quantities of data are communicated between various network points. In the Internet environment, content to be communicated between two endpoints is broken up into packets and these packets may follow different paths whilst travelling between the endpoints. It will be appreciated that the content of packets may be ordinary or anomalous.

An example of anomalous content in a packet is data that repeats with high frequency, such as the data associated with viruses, computer worms, or the like. In these circumstances, it may be advantageous to identify anomalous content in packets and then monitor subsequent packets for the anomalous content. Anomalous content in a packet may be identified by a "signature" or sequence of bytes that is present in the content. Then, all subsequent packets are checked to see if the signature is present and, if so, appropriate action may be taken to reduce any negative effects of the anomalous packet on the network.

BRIEF DESCRIPTION OF DRAWINGS

The present application is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiment of the present application. It will be evident, however, to one skilled in the art that the present invention may be practiced without these specific details.

A network anomaly may be an out-of-ordinary event in a network. For example, when a network anomaly occurs where anomalous content is sent to a destination device, the anomalous content is included in the data payload of one or more packets. A "signature" may be a sequence of bytes present in the content that may be selected as an identifier of the anomalous content. Any other packets having a similar signature may thus also potentially contain the anomalous content. Multiple signatures may be identified for each packet, and it may be thus possible to monitor the effect of multiple signatures for a network anomaly in real time.

It will be appreciated that the particular signature selected is of importance. For example, if the signature captured is a common URL, this may be a poor quality signature because it may repeat often in innocent traffic. A second example of a poor quality signature may be the occurrence of all "AAAs" which is used in some worms but is also common to a number of innocent email attachments. Resiliency, especially for blocking, requires the use of a good quality signature with small collateral damage. Thus, selection of the signature or signatures that identify a packet with potentially malicious content may be important. Various factors may be used to identify one or more appropriate signatures.

Figure 1:
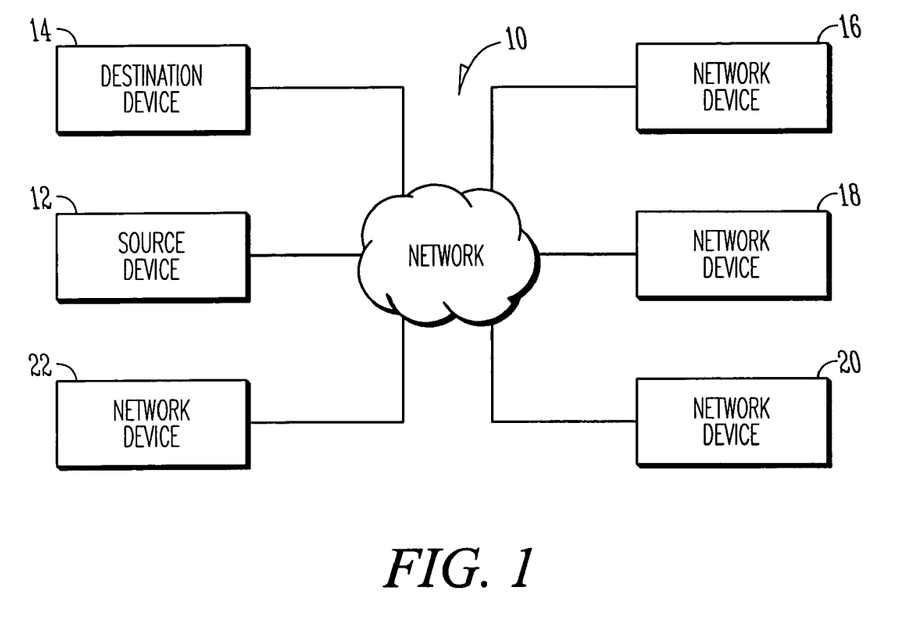
FIG. 1 shows an example network including a plurality of network devices.
Figure 2:
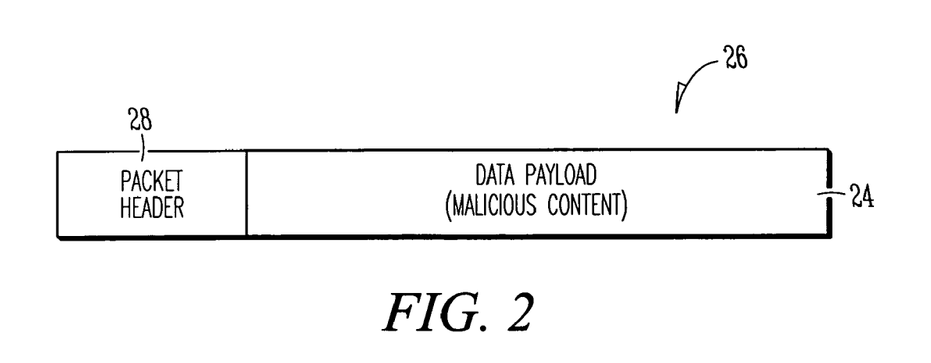
FIG. 2 shows an example packet used to communicate in the network of FIG. 1.

FIG. 1 shows an example network 10 interconnecting a plurality of network devices (e.g., routers, switches, client devices, servers, and so on). It will be appreciated that, by way of example, a source device 12 may spread malicious content 24 in a data payload of a packet 26 (see FIG. 2). A packet header 28 of the packet 26 may include a destination IP address and, following the example above, the source device 12 may send packets to a destination network device 14. It will be appreciated that many other network devices 16-22 may be provided and that the devices shown in FIG. 1 are merely by way of example. The packet 26 may have number of different signatures which may vary in uniqueness. As mentioned above, the selection of the signature or signatures used to identify the packet may be important to reduce the number of packets that have the same signature but do not, for example, include the malicious content which is being searched for. Thus, the number of false positives when searching for packets with malicious content may be reduced by an appropriate selection of one or more appropriate packet signatures.

Figure 3:
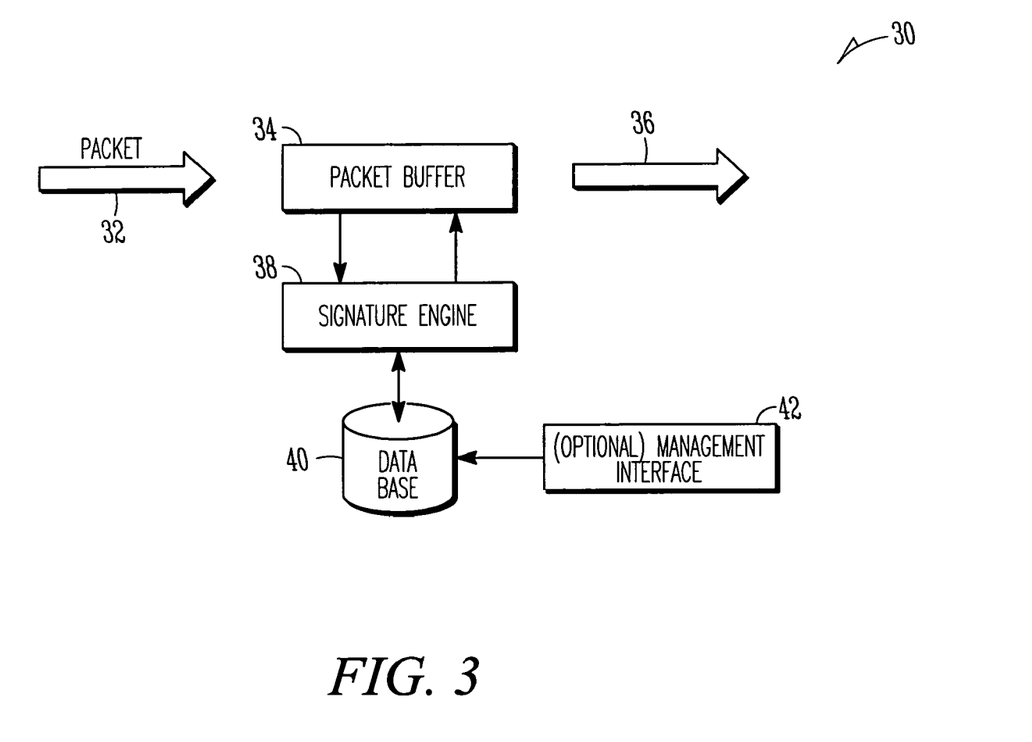
FIG. 3 shows apparatus, in accordance with an example embodiment, to classify content in a packet.

FIG. 3 shows apparatus 30, in accordance with an example embodiment, to classify potentially malicious content in a packet. For example, the apparatus 30 may be included in a router, a switch, or any other electronic device that processes packets. The apparatus 30 may receive packets 26 from a plurality of different network devices (see FIG. 1 and arrow 32 in FIG. 3). The packets 26 may be fed into a signature processing engine 38 which may then classify potentially malicious content that may be evidence of a malicious network attack. When a malicious attack is detected, the signature processing engine 38 may store packet data, source and destination IP addresses, or the like in the database 40. An optional management interface 42 may be provided to manage the apparatus 30.

In an example embodiment described herein, a pool of signatures (comprising a sequence of bytes) of a packet may be processed to determine which one (or more) may be the best signature to use for identifying similar packets in a traffic stream.

In an example embodiment, the analysis may be broken up into two parts, wherein each part builds on the previous. In a first part, only a signature or a pool of signatures may be available. In a second part, a signature and a packet from which the signature(s) was/were extracted and/or the entire flow may be available. The entire flow may, for example, essentially be the sequence of packets that were part of the same session/communication from which the signature(s) were extracted.

Signature or a Pool of Signatures Available

In an example embodiment, three metrics may be utilized to select an appropriate signature. In particular, the three example metrics may be information content or complexity of the signature, frequency at which the signature appears in a packet stream, and simple code analysis.

The complexity of the information content or complexity of the signature may be a determining factor when selecting a signature. Byte sequences of greater complexity may be assumed to occur in fewer payloads and thus may better represent a specific payload. The complexity of the signature may be determined based upon the cardinality (the number of elements in a given mathematical set) of the set of distinct byte values in the byte sequence that are elements of the universe of byte values, where a higher cardinality may correspond to higher complexity. Thus, a byte string with more distinct characters may be a good/easy first order guess of which string is the most complex of a given set, and is relatively easy to calculate. For example, the string "AAAA" has a cardinality of one whereas the string "ABCD" has a cardinality of four.

Furthermore it may be beneficial to determine the complexity based upon a weighted element set, such that some elements contribute greater or lesser value than others to the complexity. For example, we may desire to give greater importance to byte sequences which include the byte value "$", and assign a weighting factor of 2 to that value, and a weighting factor of 1 to all other values. Thus, the byte sequence "$BCD" would have greater complexity than the byte sequence "ABCD".

In an embodiment where a combined score is created from a plurality of different selection criteria or factors, a complexity score derived from the signature may be normalized to accommodate byte sequences of various lengths without creating bias. The higher the complexity, the greater the complexity score is that may be given to the signature.

Figure 4:
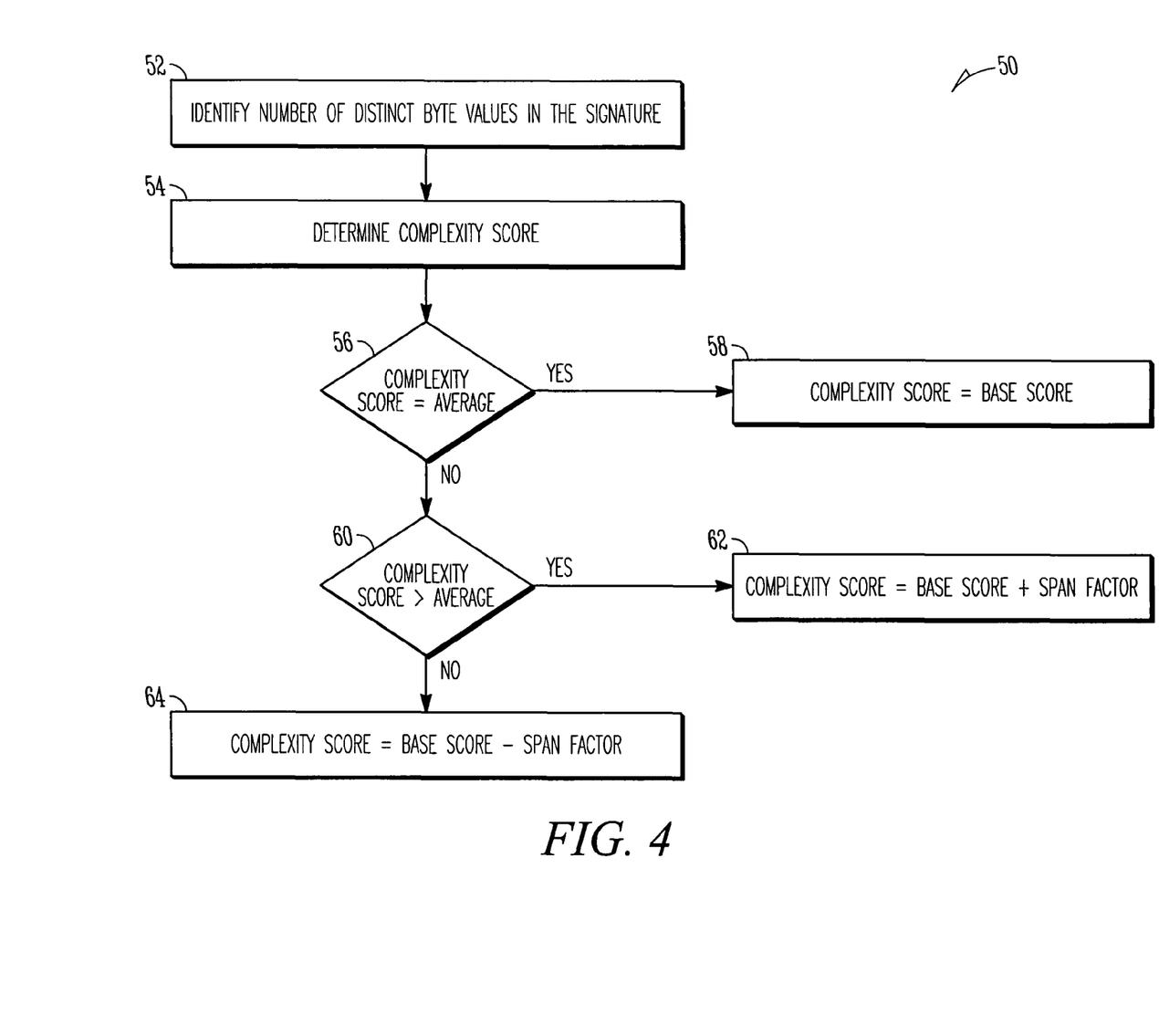
FIG. 4 shows a method, in accordance with an example embodiment, to determine a complexity score for a signature.

In FIG. 4, reference 50 shows a method to determine a complexity score for a signature, relative to the complexity of each signature in a set of signatures. As shown at block 52, the number of distinct byte values in the signature may be identified. Thereafter, a complexity score may be calculated (see block 56) such that if the complexity score is equal to an average complexity score, the method 50 may progress to block 58 where the complexity score assigned to the signature is equal to a base score. If, however, the method proceeds to decision block 60, then a determination is made of whether the complexity score for the signature is greater than the average complexity score. If so, the complexity score assigned to the signature is then taken as the base score plus a span factor. For example, the span factor may equal ((BASE_SCORE * span)/max_span). If not, the method 50 may then proceed to block 64 where the complexity score is taken as the base factor minus the span factor.

For example, the method 50 may be implemented by the following pseudo code:

```
if(complexity == average)
   complexity score = BASE_SCORE;
else if(complexity > average)
   score = BASE_SCORE + ((BASE_SCORE * span) / max_span)
else
   score = BASE_SCORE – ((BASE_SCORE * span) / max_span);
Where,
   "average" is the numeric average of the complexity of the signatures;
   and "span" is distance from the average, for each signature; and
   "max_span" is the span of the signature with the largest span
```

As mentioned above, the relative frequency of a signature in a set of signatures may also be a determining factor when selecting a signature. Assume that the signature as well as the number of times the signature has been seen in a traffic stream is available for each signature in a set of signatures. Generally speaking, if a signature appears more frequently, then it may be related to content that is very common across many packet payloads, and is thus not a good representation of the given packet and may result in high collateral damage (from false positives) if used. If a signature appears less frequently then it may be more relevant to the given packet. Therefore, in an embodiment, a signature with the lowest frequency may be selected.

However, in a polymorphic attack, it is possible that some signatures are unique and some keep varying. Thus using the lowest count may not be a favorable option. In these circumstances, clustering may be utilized and a median value may be determined. In particular, the signatures falling outside of a selected count (e.g., either the largest or smallest counts) may be discarded and a signature that falls within a cluster of counts that are within a small range of each other may be chosen. In general, if two signatures have counts that are very close to each other, then one or the other of the signatures may be a reasonable candidate.

Thus, in an example embodiment, signatures may be clustered. For a given signature, the lower the frequency, the better the signature score may be and hence the more appropriate the signature may be. As in the case of the complexity scores, signature scores may be normalized to keep a frequency component of the total score from having an excessive much bias. This may be accomplished by creating a scaling factor based upon the distance of each signature's frequency of occurrence from the average of the frequency of occurrences of all signatures in a set of signatures. A base score may be set for the average. Signatures with a frequency of occurrence below the average may add to this base score. Signatures with frequency of occurrence above the average may subtract from this base score. The further a signature's occurrence is from the average, the greater the effect on the score. Scoring may be normalized relative to the furthest frequency of occurrence from the average.

Figure 5:
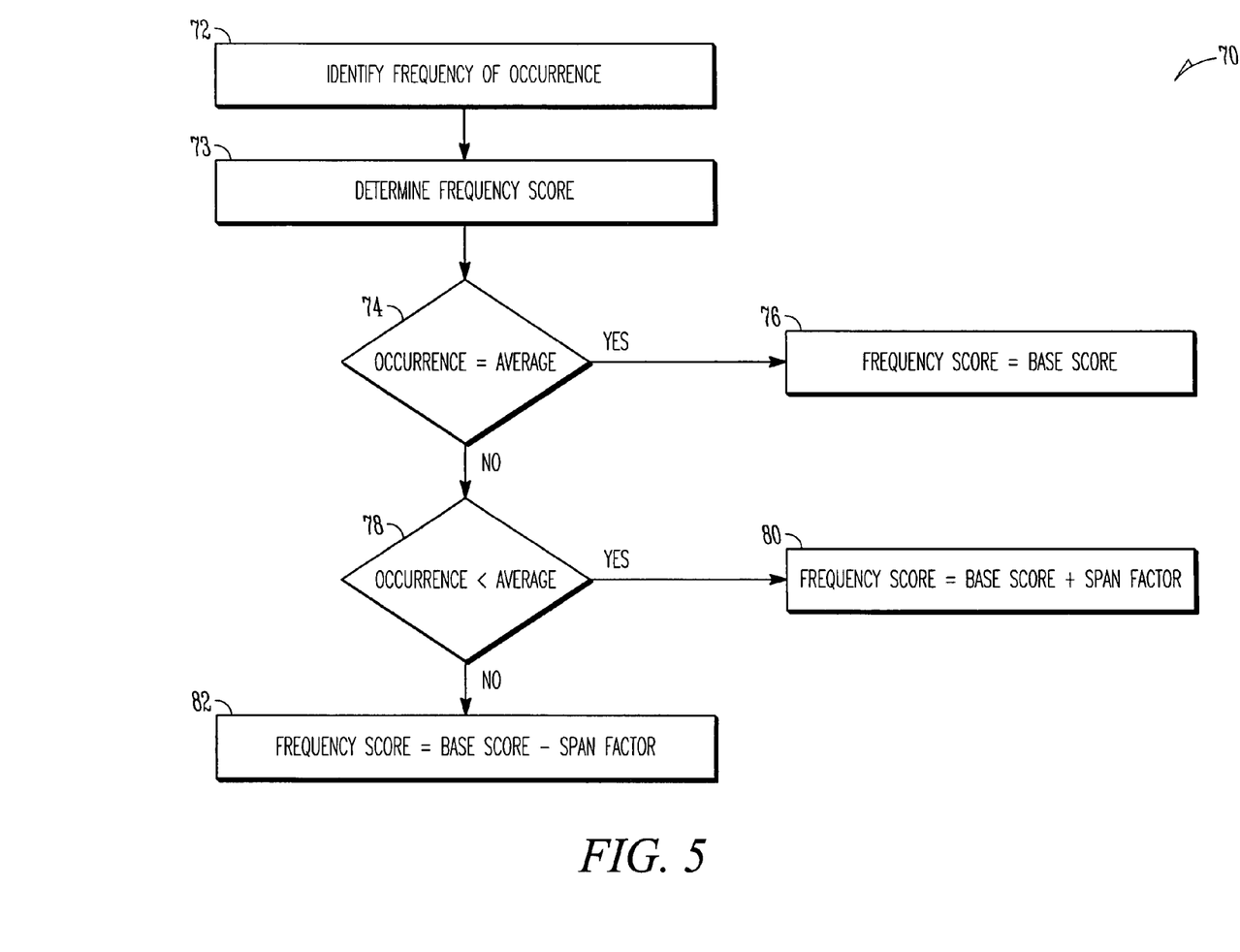
FIG. 5 shows a method, in accordance with an example embodiment, to determine a frequency score for a signature.

In FIG. 5, reference 70 shows a method to determine a frequency score for a signature. As shown at block 72, a frequency of occurrence of the signature in packets may be determined and, at block 73, a frequency score s determined. Thereafter a determination is made at block 74 if the occurrence of the signature (frequency count) is equal to an average frequency score and, if so, the method 70 progresses to block 76 where the frequency score assigned to the signature is equal to a base frequency score. If not, the method 80 proceeds to decision block 78 where a determination is made if the frequency count for the signature is less than the average frequency count and, if so, the frequency score assigned to the signature is then taken as the base frequency score plus a span factor. For example, the span factor may equal ((BASE_SCORE* span)/max_span). If not, the method 70 may then proceed to block 82 where the frequency score is taken as the base factor minus the span factor.

Example pseudo code to perform the method 70 is as follows:

```
if(occurrences == average)
    score = BASE_SCORE;
else if(occurrences < average)
    score = BASE_SCORE + ((BASE_SCORE * span) / max_span);
else
    score = BASE_SCORE - ((BASE_SCORE * span) / max_span);
```

The abovementioned methodologies for determining the frequency and complexity scores may require three passes over the data. In a first pass, the average value (be it frequency or complexity) for the set of signatures may be determined. In a second pass, the span or distance from average, for each signature may be calculated. This pass may also be used to find the span of the signature with the largest span (for normalization) referred to as the max_span. In a third pass, the signature score may be calculated.

A third factor that may be utilized to identify one or more appropriate signatures is code analysis. Code analysis of signatures may be used to augment the abovementioned count based choices of an appropriate signature. The code can be analyzed to discard common idioms (such as strings of NOPs) and the signature with the most unusual code fragment (subject to the other tests) may be selected as the appropriate signature.

Signature and Packet/Flow Available

Additional analysis may be performed if the packet and/or flow of packets from which the signature was extracted are also available. In an example embodiment, protocol analysis and conformity analysis may be utilized.

With the development of algorithms used to detect repeating signatures in IP traffic comes the need to identify those signatures which represent benign repeating sequences in the traffic flow. A large percentage of false positives detected during signature learning can be classified as application protocol headers observed traveling over well known ports (e.g., ports which have been assigned or agreed upon as being exclusively used by a given protocol). This bias can be explained as a result of protocol headers containing a number of commonly occurring byte sequences. As many payloads for protocols contain similar application level header content, they appear with enough frequency to trigger inclusion in the list of repeating signatures. The signatures may be portions of the protocol headers, and thus benign.

The method described below may be used to determine whether a signature can be identified as being part of a benign protocol header. In the example method, common attributes of application protocols may be utilized to create a method for testing a signature for conformity to a given protocol.

In an example embodiment, the protocols to be verified may tend to conform to a client/server model where the client makes a request, and the server provides a response. The set of ways a client asks for information, and the ways the server responds to that request make up the protocol. This may provide a logical separation for most of these kinds of protocols (the request portion and the response portion). Servers for most common services tend to have defined ports on which they listen on. Request behavior may be verified when a destination port for a packet is the protocol's service port and response behavior may be verified when the source port for a packet is the protocol's service port. In an embodiment, this may allow testing of a signature to be limited to a small number (e.g., one) of the known protocols, and often to be limited to either a request or a response portion of the protocol.

Application protocol headers tend to operate on a key/value pair system, with the pairs separated by some defined delimiter. Keys are a small set of identifiers for variables within the protocol. Values are the much larger set of possible values for a given key. For instance we might see a key "Color" with values "red", "blue", "green", etc. The values could be limited to primary colors, colors of the rainbow, every color in a 200 crayon box, etc. For example, the value for any key for any protocol may not be important but only the maximum "normal" size of a value would be for a given key may be important. This methodology may work well with given observations of truly malicious content in application protocol headers, which tend to be buffer overflow exploits and thus by the nature of exploit, that are extremely long.

The above allows testing of the signature to be limited to a search for keys inside or before the signature, which along with their expected value lengths, may assist in identifying substrings as conforming to the protocol. In addition, it is possible to easily identify signatures that are associated with threats to specific application protocol headers. For example, if an HTTP protocol exploit is known to occur following the key "GET", signatures which contain the key may be identified as being more interesting.

Figure 6:
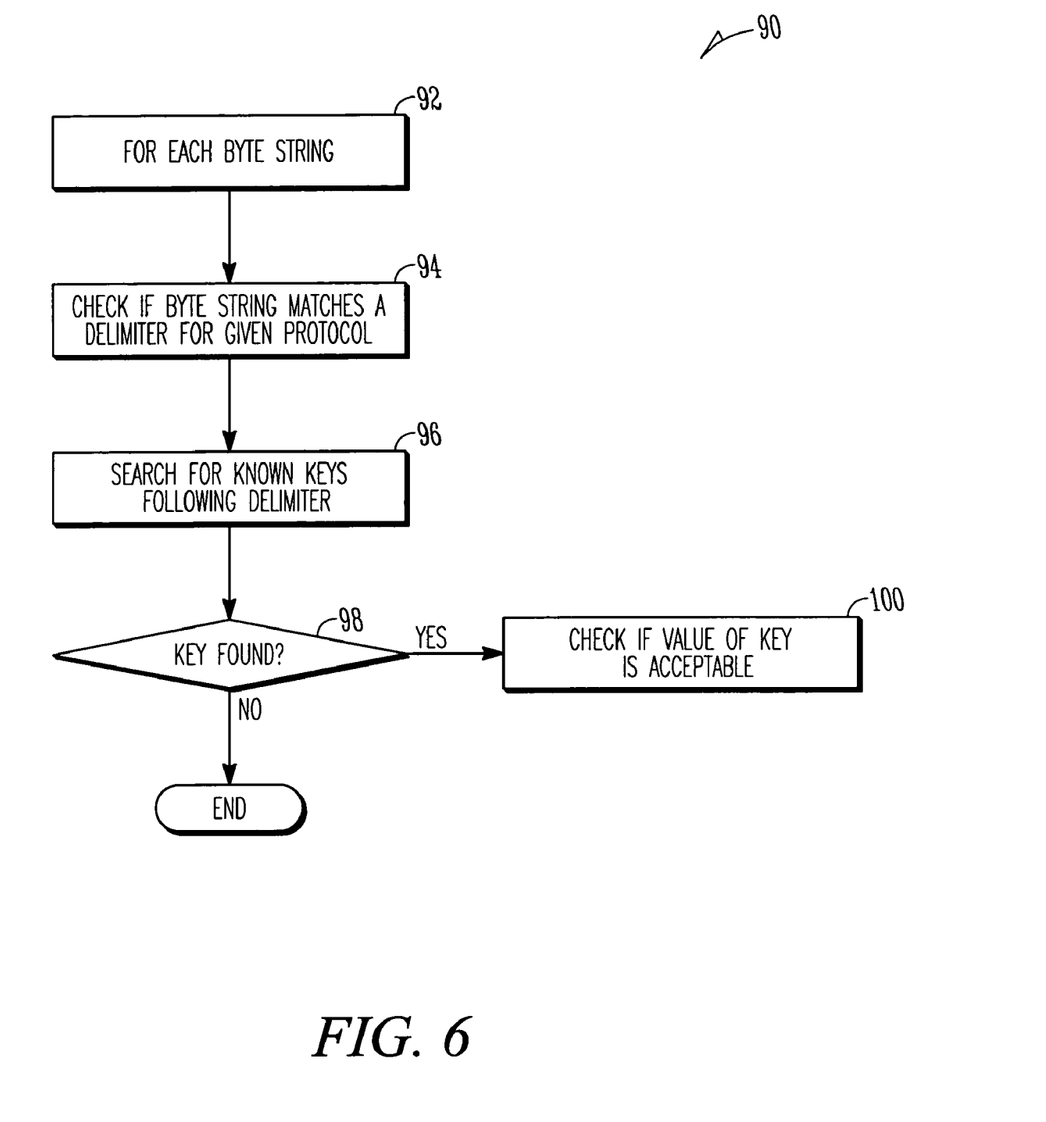
FIG. 6 shows a method of code analysis, in accordance with an example embodiment to detect malicious content in a packet.

FIG. 6 shows an example method 90 of code analysis to detect malicious content in a packet. The method 90 may start by analyzing the last byte of the signature, and move backwards byte by byte, towards the first byte. At each point, a check may be conducted to determine if a byte string starting at that point matches the delimiter for a given protocol (see block 94). Thereafter, known keys are searched for in the byte string following the matched delimiter (see block 96). As shown at decision block 98, if a key is found, a check may be performed to determine if the key's acceptable value-length reaches the end of the signature before reaching the next delimiter (see block 100). If that is true, the point from the beginning of the key to the end of the signature may be considered as being "covered". The method 90 may continue to move backwards repeating the test starting at the previous byte's position. If the byte string does match a key, but the key's acceptable value-length doesn't reach the end of the signature or a point of coverage when the delimiter is found, then a determination cannot be made of whether the signature is anomalous or not.

In many cases, a given key may only partially cover a signature, but still reach the end point of coverage. In those cases the point of "coverage" may be moved from the end of the signature to the point where the known key starts. The process may then be repeated again, moving to the previous byte, and looking for another key.

Once the point of coverage reaches the beginning of the signature, it may be concluded that a successful match has been obtained. If the beginning of the payload is reached without covering the signature, a final check must be performed to determine if a key is at the start of the payload (no delimiter) or end up with an unsuccessful match. As with many algorithms, multiple variations may be defined which give similar results but provide different levels of "strictness" of conformity.

In an example embodiment, the algorithm mentioned above is utilized but the requirement for successful coverage may be changed to include the requirement that at least one key appears within the signature, or for a key's value to completely cover every byte of the signature. In an example embodiment, the abovementioned algorithm may be utilized but the requirement for successful coverage may be changed to include the requirement of a key or its acceptable length's value to appear within in the signature. In an example embodiment, an algorithm may be implemented where search is conducted for keys at each offset, and a check for the delimiters is then performed but such an implementation may be slower than the method described above. In an example embodiment, an algorithm may be implemented where the search for keys or delimiters is performed forwards from the beginning of the packet rather than backwards from the end of the signature, but such an implementation may be slower than the method described above.

Figure 7:
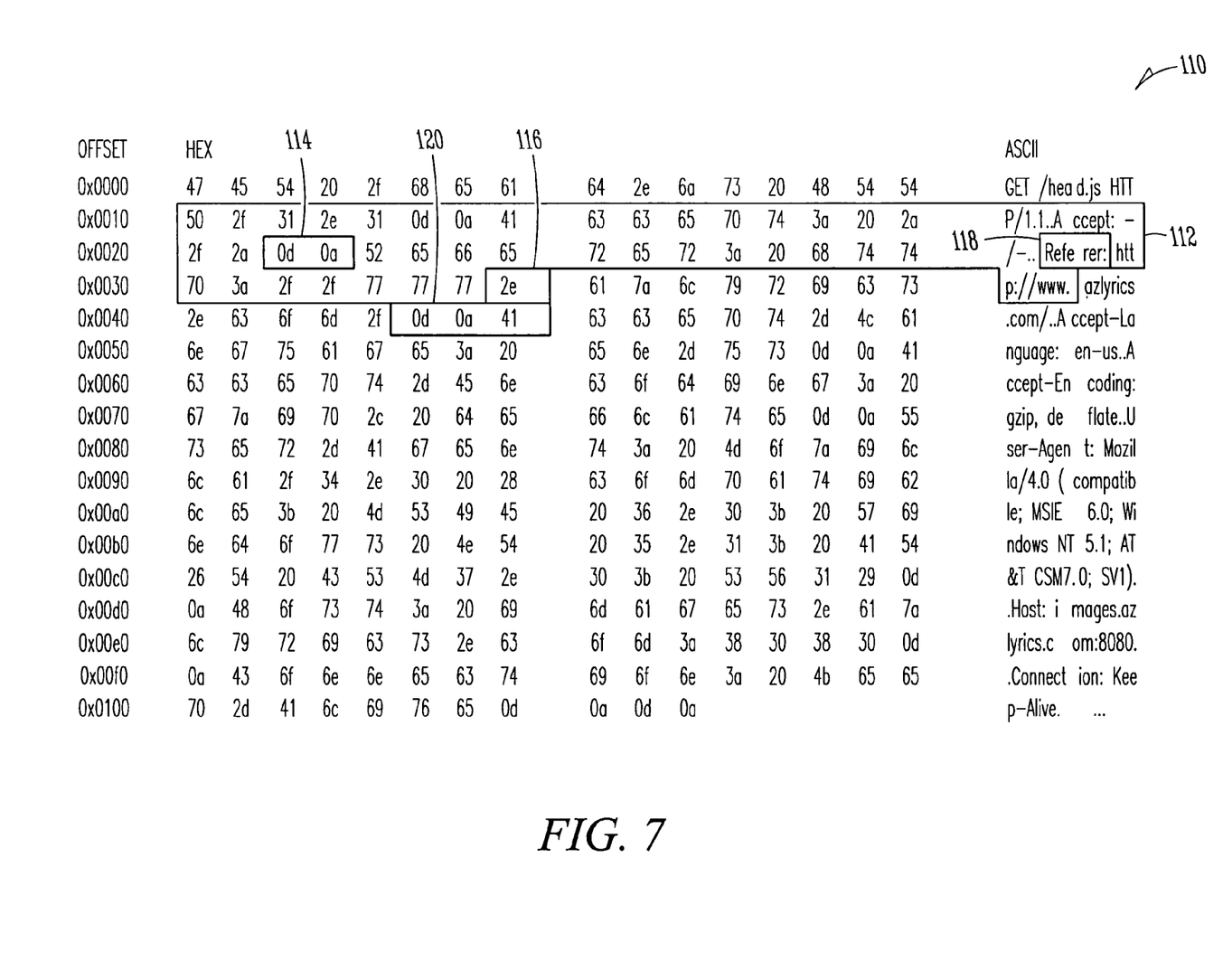
FIG. 7 shows example HTML which the method of FIG. 6 may process.

FIG. 7 shows example HTTP packet 110 which the method of FIG. 6 may process. The example HTTP packet in FIG. 7 is shown to include a signature portion 112. For the HTTP protocol, the relevant keys in this example are "GET", "Accept:", and "Referer:". The example delimiter is the hex string "0x0d0a" 114 which is found at offset 0x0022.

To prove that the signature 112 is benign, the method 90 may start from the end of the signature (at offset 0x0037) 116, scanning towards the beginning of the signature looking for 0x0d0a 114. Following the delimiter 114, a key may be searched for, which in the given example is "Referer:" 118. Based upon observations of HTTP traffic, it may be concluded that the Referer tag is rarely if ever longer than 384 bytes. Scanning forward from the Referer key 118 an ending delimiter at offset 0x0045 120 may be found. This may be well within the acceptable range for the Refer key and is after the end of the signature. The point from the matched delimiter to the end of the signature may be considered as covered.

If coverage of the entire signature 112 is required to be verified, the process may begin again from offset 0x0021, scanning for another delimiter. In the given example, the delimiter would be found at 0x0015. Following that delimiter the key "Accept:" may be found, which again based on observation of common packet traffic, may rarely be more than 256 bytes. Again the ending delimiter for that key is well within range and is the last point of coverage. The point of coverage moved to the beginning of the Accept key's starting delimiter. Scanning backwards again, the beginning of the payload would be reached without finding another delimiter. Since it is the beginning of the payload, one final test may be performed to determine a key starting can be found starting from that position. In given example, "GET" would be found. The length of a GET key's value may, for example be set to 384 bytes. It will however be appreciated that there are many valid URLs which are much longer than 384 bytes, and many implementations of HTTP servers handle URLs in the 2000 to 8000 byte range. However, merely by way of example, a value-length 384 has been chosen, which may be adequate for a substantial number of valid URL GET requests. Again the end delimiter for the GET key is well within range and is the last point of coverage. Thus, in the given example, it may be concluded that that this signature is benign.

In order to determine a quality of the signature, it may be advantageous to understand the type of content that the signature resides within. Some protocols break up their data into content sections of different types. In email, for example, the tag <Content-Type: X> informs the reader of the protocol what the type of data in the following section is. On a web page, the tag <script type="X"> informs the reader of a section that contains script commands.

In an embodiment, for determining network anomalies, particular attention may be paid to content sections whose data is to be processed by other programs or which will be run as code. So, for the email example, a signature residing within a content-type of text/plain may be an indication of a lower quality signature, and a signature within a content-type of application/X may be an indication of a high quality signature. For web pages, any signature between script tags may be regarded to be high a quality signature.

It may also be important to continue content sections across packets in a packet flow. In an embodiment, if a content section doesn't end before the end of a packet, then that content section should cover the beginning of the next packet in the flow. If such an analysis is not done, then every packet in the flow would have to begin with an "unknown" content section, which would reduce the precision of the methodologies described herein.

In an embodiment, to enhance processing speed, a finite state machine may be utilized to search for either a "Content-Type" string or a "<script" string at the same time. This may allow a single-pass through a packet, rather than multiple passes to extract the relevant data. Then, the type itself may be stored within a database and associated with both the packet and the flow. This type may be given a sequence number, which increments for each new type added to the flow. When a new packet in the same flow is received, the highest sequence number content type may be used to identify the first content type in the next packet. When the Content-Type tag or the <script tag is broken across packets, the first section may be left as an unknown content-type.

The growing variety of network traffic makes it difficult to enforce security, measurement and traffic shaping policies without affecting unintended traffic flows. In an example embodiment, a content analysis engine uses a content section identification module, a protocol parser module, and a conformity module to classify packets into various traffic classes. The content analysis engine may classify content on the following 4 tuple: source port number, destination port number, content section IDs, and data content classification score.

The source and destination port numbers may be obtained from the packet. The content section IDs may be Multipurpose Internet Mail Extensions or MIME-type identification, HTML tag section IDs, XML tag IDs or other content section class IDs obtained from the content section identification module. A data content classification score may be the percentage of ASCII or code content in the data section of the packet (e.g. after the TCP/UDP header). This score may be calculated from a full disassembler that tries to match the bytes in the data portion of the packet to valid and reasonable platform opcodes (e.g. x86 opcodes). It may also be calculated from inspecting each byte offset in the data for the occurrence of commonly used opcodes (e.g. add,mov,pop in x86) and their close proximity (in bytes). The score may also be calculated from detecting known opcode sequences that represent common malicious code segments (e.g. opening a shell, invoking a system call or accessing known system files). Furthermore, each character (or a sampling of characters), 8 bits, in the packet 26 can be checked to see if they are valid printable ASCII characters or one of space, tab, carriage return or line feed. A high concentration of printable and white-space ASCII characters, as described above, may signify an ASCII section of the data which is probably benign.

To classify content, embodiments may use the above 4 tuple in any configuration to match a particular traffic content. The classifications can either be done on the designated representative signature for a packet or on all identified signatures of the packet. In the former case, the class of the packet is the same as the class of the representative signature. In the latter case, however, the class of the packet may be determined from the classes of all its identified signatures (e.g. majority class chosen as packet class). In an embodiment, all these operations can be done on any of the data boundaries including packet fragments, full packets, partial flows, full flows, or the like.

Figure 8A:
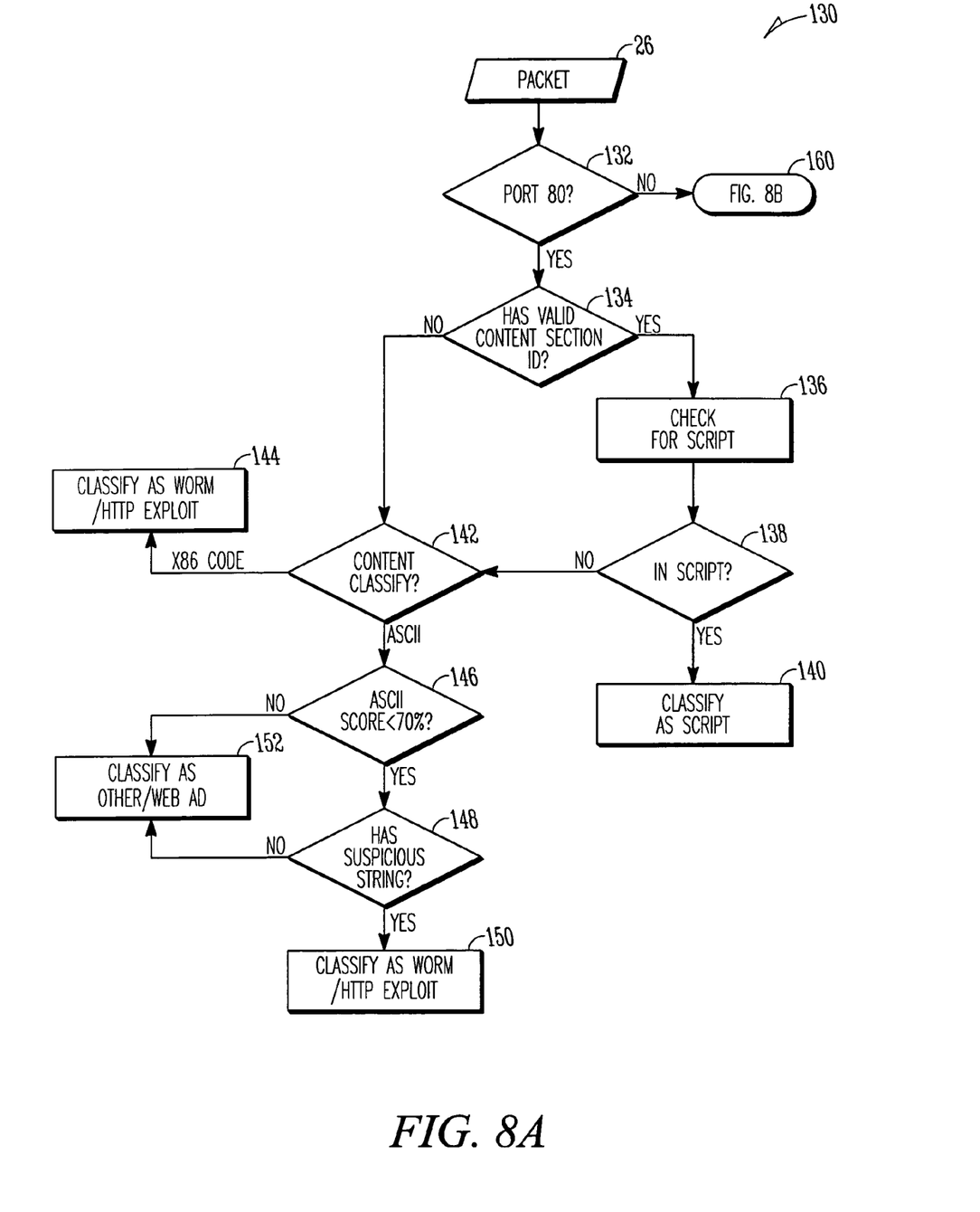
FIGS. 8A and 8B show a method, in accordance with an embodiment, for content classification.
Figure 8B:
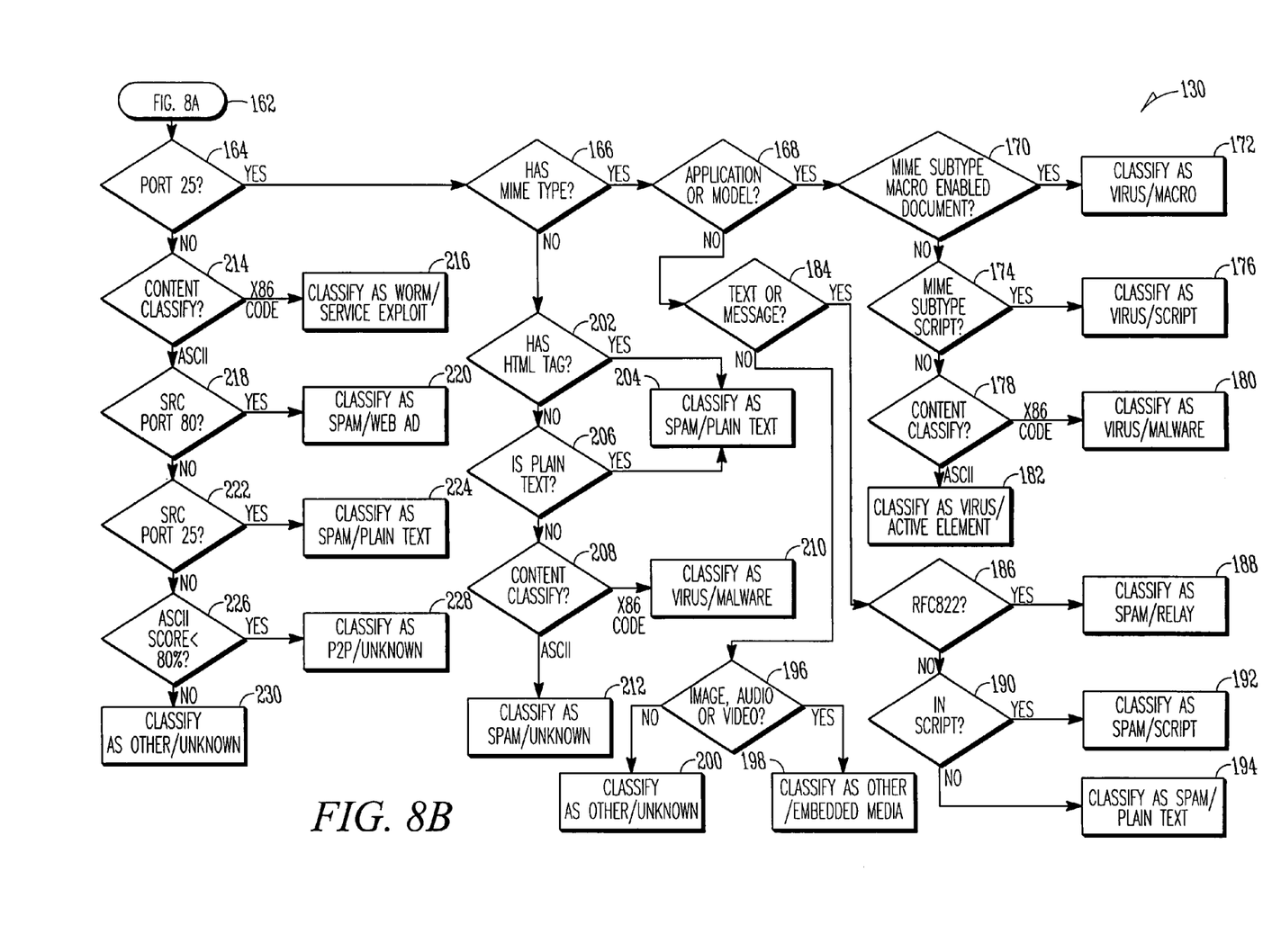

An example method 130 using such a configuration for content classification is shown in FIGS. 8A and 8B. In this example method various conditions are used to identify particular traffic content. For example to classify content as an HTML script (one of four example data boundaries) the method 130 may be performed.

Referring to FIG. 8A, as shown at decision block 132, and considering a designated string to classify, if the packet 26 is destined to port 80, then the method 130 proceeds to decision block 134. At decision block 134, a determination is made if the content section encapsulating the designated signature has a valid MIME-type/content section ID and, if so, a check is conducted at block 136 to determine if the packet 26 includes a script. As shown at decision block 138, if the content section does include a script then the content section is classified as a script at block 140. If, however, the content section does not include a script then the method 130 proceeds to block 142. It will be noted that if the content section has a valid MIME-type/content section ID (see block 134) then the method 130 proceeds directly to decision block 142.

In decision block 142, the method 130 classifies the content of the content section to determine if it is X86 code and, if so the content section is then classified as a worn/http exploit as shown at block 144. If, however, the content is classified as ASCII, then the method proceeds to decision block 146 where a determination is made if an ASCII score is less than, for example, 70%. If the ASCII score is less than 70%, then the method 130 proceeds to decision block 148 where an investigation is conducted to determine whether or not the content section includes a suspicious byte sequence and, if so, the content section is classified as a worm/http exploit at block 150. A suspicious byte sequence contains potentially malicious patterns. Example of such byte sequences are name of executable files (for example ".exe"), name of system calls (for example "GetTickCount") and common shell commands (for example "rm"). If, however, at block 148, it is determined that the content section does not include a suspicious byte sequence, then the method 130 proceeds to block 152 where the packet 26 is classified as an other/web ad. As shown at decision block 146, if the ASCII score is less than 70%, then the method 130 proceeds directly to decision block 152. If, however, the packet 26 is not communicated via port 80 (see decision block 132) then the method 130 proceeds to that part of the method 130 shown in FIG. 8B (see block 160).

As shown at block 162 (see FIG. 8B), after the method 130 has ascertained that the packet 26 is not from port 80, a determination is made if the packet 26 was from port 25 (see decision block 164). If the packet 26 is from port 25, then the method 130 proceeds to decision block 166 where a determination is made if the content section has a valid MIME-type/content section ID and, if so, a determination is made whether or not the content section is an application or model (see block 168). If the content section is an application or model then, as shown at decision block 170, a determination is made if the content section relates to an MIME subtype macro-enabled document. If the content section is related to an MIME subtype macro-enabled document and, if so, the method 130 classifies the designated signature as a virus/macro as shown at block 172. Returning to decision block 170, if the content section is not associated with an MIME subtype macro-enabled document, then a determination is made if the content section corresponds to an MIME subtype script at decision block 174 and, if so, the designated signature is classified as a virus/script at block 176. If, however, at block 174, a determination is made that the content section does not correspond to an MIME subtype script, then at decision block 178 the content of the content section is classified as X86 code whereafter the designated signature is classified as a virus/malware at block 180. If, however, the content of the content section is classified as ASCII, then the designated signature is classified as a virus/unknown as shown at block 182.

Returning to block 168, if the content section is not associated with an application or a model, then the method 130 proceeds to decision block 184 to determine whether or not the content section is associated with text or a message. If the content section is associated with a text or message, then the method 130 proceeds to determine at block 186. If the content section is associated with RFC822 the designated signature is classified as spam/relay (see block 188). If, however, the content section is not associated with RFC822, then as shown at decision block 190, a determination is made if the content section is in a script and, if so, the designated signature is classified as spam/script as shown at block 192. If, however, the content section is not in a script, the designated signature may be classified as spam/plain text as shown at block 194. Returning to block 184, if the content section is not associated with text or a message, then a determination is made at decision 196 to determine if the content section is associated with an image, audio or video. If the content section is associated with an image, audio or video, the designated signature may be classified as other/embedded media as shown at block 198. If, however, the content section is not associated with an image, audio or video then the designated signature is classified as other/unknown at block 200.

Returning to decision block 166, if the content section does not have a valid MIME type/content section ID, then a determination is made if the content section includes an HTML tag at decision block 202. If the content section includes an HTML tag, then the designated signature is classified as spam/plain text at block 204. If, however, the content section does not include an HTML tag, then a determination is made at block 206 to determine if the content section is mostly plain text and, if so, the designated signature is also classified as spam/plain text (see block 204). If, however, the content section at decision block 206 is not determined to contain plain text, then at decision block 208 the content of the content section is classified. If the content is classified as X86 code, then the packet 26 is classified as a virus/malware at block 210. However, if the content is classified as ASCII at block 208, then the packet 26 is classified as spam/unknown at block 212.

If the packet 26 was not associated with port 25 (see decision block 164), then at decision block 214 the content is also classified. If the content is classified as X86 code, then the packet 26 is classified as worm/service explicit (see block 216) and, if the content is classified as ASCII, the method 130 proceeds to decision block 218. In decision block 218, a determination is made if the source port of the packet 26 is 80 and, if so, the packet 26 is classified as spam/web ad (see block 220). However, if the source port is not 80, then a determination is made whether or not the source port is port 25. If the source port is 25, then the packet 26 is classified at block 224 as spam/plain text. If, however, the source port is not port 25, then a determination is made at block 226 to ascertain if an ASCII score is less than, for example, 80% and, if so, then the packet 26 is classified as P2P/unknown as shown at block 228. If, however, the ASCII score is not less than 80%, then the packet 26 may be classified as other/unknown as shown at block 230. It will be noted that that multiple classifications may be given to content according to the criteria they satisfy.

Figure 9:
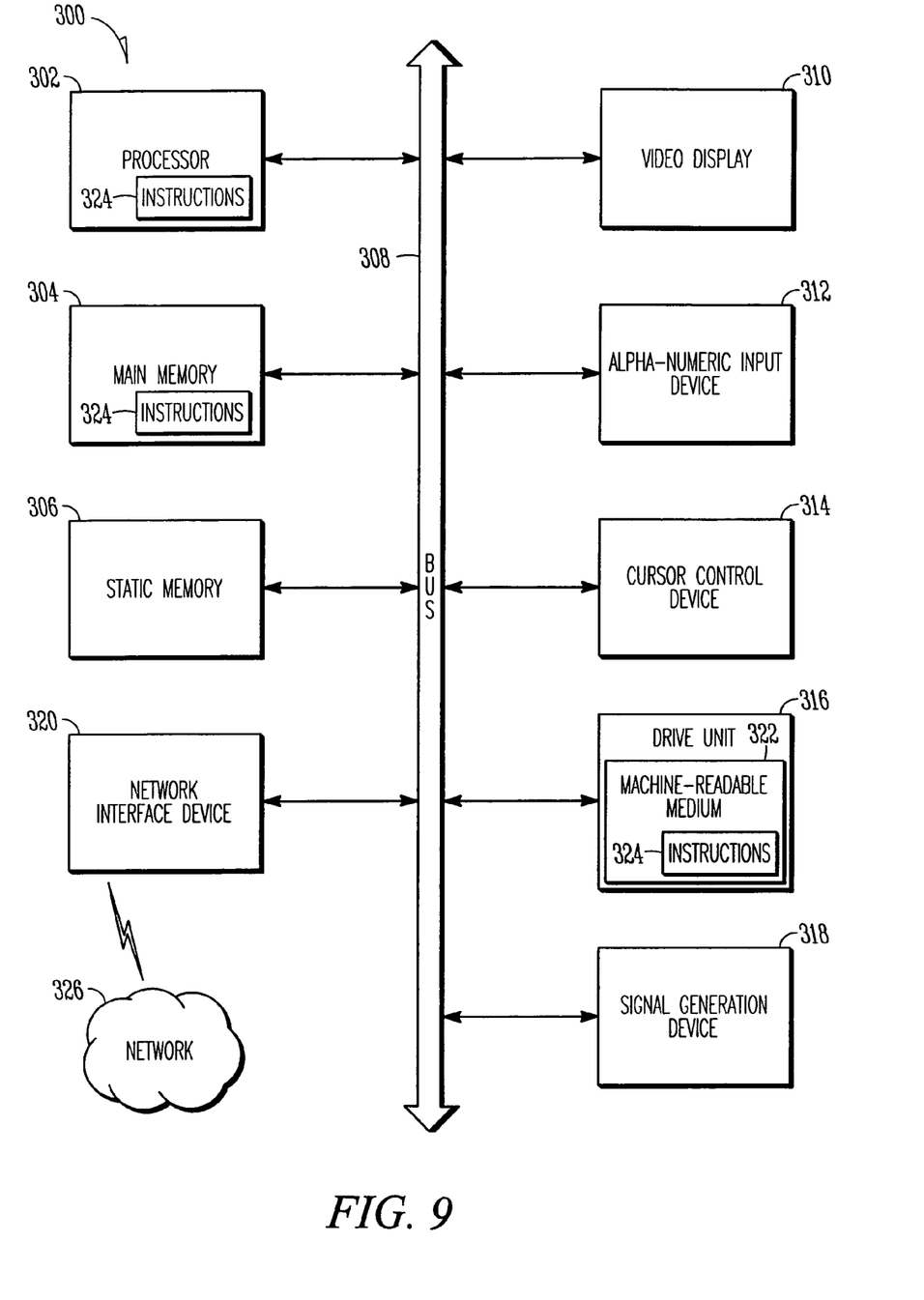
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 300 within which a set of instructions, for causing the machine to perform any one or more of the methodologies discussed herein, may be executed. It will be appreciated that some of the components of the computer system 300 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to select a representative signature for use in identifying content in a packet stream, the representative signature being present in the content, the method comprising:
   receiving the packet stream;
   obtaining content from a data payload of a packet in the packet stream;
   identifying a plurality of signatures from the content, wherein the content includes each of the plurality of signatures;
   determining at least one of a complexity score and a frequency score based on the content; and
   selecting a signature of the plurality of signatures as the representative signature based on at least one of the complexity score and the frequency score.

2. The method of claim 1, in which identifying the plurality of signatures includes identifying a set of distinct data values, the method comprising:
   determining a complexity score for each data value; and
   selecting a data value with a highest complexity score as a potential representative signature.

3. The method of claim 2, wherein the complexity score is determined based upon the cardinality of the set of distinct data values in the packet stream, where a higher cardinality corresponds to higher complexity.

4. The method of claim 2, which includes determining the complexity score based upon a weighted element set.

5. The method of claim 2, which includes normalizing the complexity score.

6. The method of claim 2, wherein:
   if the determined complexity score is equal to an average complexity score then the complexity score of the data value is set at a base score;
   if the determined complexity score is greater than the average complexity score then the complexity score of the data value is set at a base score plus a span factor; and
   if the determined complexity score is less than the average complexity score then the complexity score of the data value is set at a base score minus the span factor.

7. The method of claim 1, which comprises:
   monitoring a frequency at which the signature is included in packets in the packet stream; and
   selecting a signature with a lowest frequency as a potential representative signature.

8. The method of claim 7, which comprises:
   comparing the monitored frequency to a selected count; and
   selectively eliminating the signature as a potential representative signature in response to the comparison.

9. The method of claim 7, wherein:
   if the frequency count is equal to an average frequency count then the frequency score of the data value is set at a base score;
   if the frequency count is less than the average frequency count then the frequency score of the data value is set at a base score plus a span factor; and
   if the frequency count is greater than the average frequency count then the frequency count of the data value is set at a base score minus the span factor.

10. The method of claim 7, which includes normalizing the frequency score.

11. A non-transitory computer-readable medium embodying a sequence of instructions which, when executed by a machine, cause the machine to receive the packet stream; obtain content from a data payload of a packet in the packet stream; identify a plurality of signatures from the content, wherein the content includes each of the plurality of signatures, and each of the plurality of signatures comprises a sequence of bytes of anomalous content; determine at least one of a complexity score and a frequency score based on the content; and select a signature of the plurality of signatures as the representative signature based on at least one of the complexity score and the frequency score.

12. A system to select a representative signature for use in identifying content in a packet stream, the apparatus comprising a plurality of modules, the representative signature being present in the content, each module comprising instructions retained on at least one non-transitory computer-readable medium, that when executed by a machine perform identified operations, wherein the modules are adapted to: receive, by the apparatus, the packet stream; obtain content from a data payload of the packet in the packet stream; identify a plurality of signatures from the content, wherein the content includes each of the plurality of signatures; determine at least one of a complexity score and a frequency score based on the content; and select a signature of the plurality of signatures as the representative signature based on at least one of the complexity score and the frequency score.

13. The system of claim 12, in which identifying the plurality of signatures includes identifying a set of distinct data values, and wherein:
a complexity score for each data value is determined; and
a data value with a highest complexity score is selected as a potential representative signature.

14. The system of claim 13, wherein the complexity score is determined based upon the cardinality of the set of distinct data values in the packet stream, where a higher cardinality corresponds to higher complexity.

15. The system of claim 13, which includes determining the complexity score based upon a weighted element set.

16. The system of claim 13, wherein the complexity score is normalized.

17. The system of claim 13, wherein:
if the determined complexity score is equal to an average complexity score then the complexity score of the data value is set at a base score;
if the determined complexity score is greater than the average complexity score then the complexity score of the data value is set at a base score plus a span factor; and
if the determined complexity score is less than the average complexity score then the complexity score of the data value is set at a base score minus the span factor.

18. The system of claim 12, wherein the signature engine:
monitors a frequency at which the signature is included in packets in the packet stream; and
selects a signature with a lowest frequency as a potential representative signature.

19. The system of claim 18, wherein the monitored frequency is compared to a selected count and the signature is selectively eliminated as a potential representative signature in response to the comparison.

20. The system of claim 18, wherein:
if the frequency count is equal to an average frequency count then the frequency score of the data value is set at a base score;
if the frequency count is less than the average frequency count then the frequency score of the data value is set at a base score plus a span factor; and
if the frequency count is greater than the average frequency count then the frequency count of the data value is set at a base score minus the span factor.

21. The system of claim 18, which includes normalizing the frequency score.

22. Apparatus to select a representative signature for use in identifying content in a packet stream, the representative signature being present in the content, the apparatus comprising:
means for receiving the packet stream;
means for obtaining content from a data payload of a packet in the packet stream;
means for identifying a plurality of signatures from the content, wherein the content includes each of the plurality of signatures;
means for determining at least one of a complexity score and a frequency score based on the content; and
means for selecting a signature of the plurality of signatures as the representative signature based on at least one of the complexity score and the frequency score.

23. The method of claim 1, wherein the complexity score represents a measure of the level of complexity present in a byte string, the byte string selected from the content as one of the plurality of signatures; and
wherein the frequency score represents a measure of how often the byte string appears within the packet stream.

* * * * *

UNITED STATES PATENT AND TRADEMARK OFFICE
CERTIFICATE OF CORRECTION

| | | |
|---|---|---|
| PATENT NO. | : 8,010,685 B2 | Page 1 of 1 |
| APPLICATION NO. | : 11/272461 | |
| DATED | : August 30, 2011 | |
| INVENTOR(S) | : Sumeet Singh et al. | |

It is certified that error appears in the above-identified patent and that said Letters Patent is hereby corrected as shown below:

In column 13, line 20, in Claim 12, delete "of the" and insert -- of a --, therefor.

Signed and Sealed this
Eighth Day of November, 2011

David J. Kappos
*Director of the United States Patent and Trademark Office*